United States Patent [19]

Braga et al.

[11] Patent Number: 5,471,555
[45] Date of Patent: Nov. 28, 1995

[54] FIBER OPTIC RIBBON BREAK-OUT DEVICE WITH ENHANCED STRAIN RELIEF

[75] Inventors: David J. Braga, Raleigh; Thomas L. Carter, Cary; Edward M. Dozier, Raleigh, all of N.C.; John P. Sarbell, Grand Island, Fla.

[73] Assignee: Sumitomo Electric Lightwave Corp., Research Triangle Park, N.C.

[21] Appl. No.: 342,849

[22] Filed: Nov. 21, 1994

[51] Int. Cl.⁶ .................................................. G02B 6/36
[52] U.S. Cl. ..................... 385/136; 385/137; 385/114; 385/86; 385/87; 385/80
[58] Field of Search .................................. 385/76, 77, 78, 385/80, 81, 84, 86, 87, 134, 136, 137, 139, 114

[56] References Cited

U.S. PATENT DOCUMENTS

| | | | |
|---|---|---|---|
| 4,305,642 | 12/1981 | Bloodworth, Jr. et al. | 385/114 X |
| 5,115,260 | 5/1992 | Hayward et al. | 385/100 |
| 5,134,673 | 7/1992 | Stephenson et al. | 385/56 |
| 5,394,495 | 2/1995 | Booth et al. | 385/59 |
| 5,402,512 | 3/1995 | Jennings et al. | 385/46 |
| 5,422,971 | 6/1995 | Honjo et al. | 385/80 |

*Primary Examiner*—Brian Healy
*Attorney, Agent, or Firm*—Richard E. Jenkins

[57] ABSTRACT

A break-out device particularly adapted for providing enhanced strain relief to the fiber optic ribbon which is broken out into individual optical fibers within the device. The break-out device comprises a housing having an aperture in one end to receive a fiber optic ribbon and an aperture in the opposing end to allow an exit for individual buffered optical fibers. A flexible elongate strain relief clamp is provided which is adapted to be fixedly positioned within the housing. The strain relief clamp includes an aperture in the medial portion thereof adapted to receive a fiber optic ribbon therein, and the strain relief clamp is further adapted to then be folded back upon itself at the aperture so as to fixedly engage the fiber optic ribbon between the overlaying portions thereof.

13 Claims, 3 Drawing Sheets

FIBER OPTIC RIBBON BREAK-OUT DEVICE WITH ENHANCED STRAIN RELIEF

TECHNICAL FIELD

The present invention relates to break-out devices for fiber optic ribbons, and more particularly to an improved break-out device providing enhanced fore and aft strain relief for fiber optic ribbon.

RELATED ART

Fiber optic ribbon is formed by adhering multiple optical fibers into a flat matrix with a suitable encapsulant resin so as to form a compact fiber optic ribbon unit. As is well known to one skilled in the fiber optic art, at prescribed dimensionally selected ends of the fiber optic ribbon access to all optical fibers carried thereby is required for connectorization. The access to each individual optical fiber requires separation of the optical fibers from the fiber optic ribbon at a specified dimension from the end of the fiber optic ribbon (otherwise known as the "break-out" point). The break-out point is, in fact, the transition point from fiber optic ribbon to individual optical fibers, and creates a higher fragility factor location requiring protection, control, and strain relief of the fiber optic ribbon and optical fibers broken out therefrom at the break-out point. The utilization of the finished product, connectorized fiber optic ribbon, by the end user requires that the aforementioned protection control and strain relief of the fiber optic ribbon at the break-out point be contained in a compact, small, strategically shaped package which has become known in the fiber optic industry as a "break-out" device.

However, although break-out devices are known in the fiber optic industry and serve to attempt to meet the aforementioned objectives, presently known break-out devices suffer shortcomings which are known to those skilled in the art, particularly a failure to properly support and protect the fiber optic ribbon from both fore and aft strain at the break-out point. This can result in many problems including inadvertent splitting of the fiber optic ribbon beyond the desired break-out point within a break-out device.

Presently known break-out devices in the fiber optic industry attempt to protect the area of the fiber optic ribbon that has been broken out or separated into individual optical fibers. The optical fibers are each provided with a buffer tube (most suitably about 900 micrometers in diameter). Thus, each optical fiber has a fiber optic connector applied at one end and a buffer tube extending therefrom to the other end which is inserted into the break-out device. The break-out device serves to both protect and retain the buffered fibers at the break-out point within the break-out device.

More specifically, as the individual optical fibers join together at the fiber optic ribbon inside the break-out device, the fiber optic ribbon and optical fibers should be provided with strain relief in both the fore and aft directions. Prior art break-out devices have not satisfactorily met this need, but applicants' novel strain relief device provides a unique break-out device which is unexpectedly and surprisingly superior in the efficacy of the strain relief provided to the fiber optic ribbon contained within the break-out device. Therefore, applicants' improved break-out device meets the long-felt need of the fiber optic industry for an improved break-out device with enhanced fore and aft strain relief performance.

DISCLOSURE OF THE INVENTION

In accordance with the present invention, applicants provide a break-out device for a fiber optic ribbon comprising a housing which is adapted to receive a fiber optic ribbon within one end and to provide an exit for a plurality of buffered fibers at the opposing end of the housing. A flexible elongate strain relief clamp is provided which is adapted to be fixedly positioned within the housing to provide strain relief to the fiber optic ribbon positioned within the break-out device. The strain relief clamp has an aperture in the medial portion thereof and is adapted to receive a fiber optic ribbon within the aperture and to then be folded back upon itself at said aperture so as to fixedly engage the fiber optic ribbon between the overlaying portions of the clamp.

It is therefore the object of the present invention to provide an improved break-out device for fiber optic ribbon which provides enhanced strain relief to the fiber optic ribbon carried therein.

It is another object of the present invention to provide an improved break-out device for fiber optic ribbon which requires only very low assembly time and is inexpensive to manufacture.

It is still another object of the present invention to provide an improved break-out device for fiber optic ribbon which provides enhanced fore and aft strain relief to the fiber optic ribbon and separated-out optical fibers therein.

It is still another object of the present invention to provide an improved break-out device for fiber optic ribbon which provides for fool-proof alignment of the fiber optic ribbon within the break-out device.

It is still another object of the present invention to provide an improved break-out device for fiber optic ribbon which provides better protection against inadvertent splitting of the fiber optic ribbon beyond the desired break-out point within the break-out device.

Some of the objects of the invention having been stated, other objects will become evident as the description proceeds, when taken in connection with the accompanying drawings described hereinbelow.

BEST MODE FOR CARRYING OUT THE INVENTION

Referring now to FIGS. 1–4, break-out device 100 will be described in specific detail. It will be appreciated by one skilled in the art that fiber optic ribbon break-out device 100 is normally applied at one end of an overall fiber optic ribbon which may have a length of, for example, from five meters to several hundred meters. Break-out device 100 can be applied at either one or both ends of a fiber optic ribbon, although normally it would be applied at only one end.

Subsequent to application of break-out device 100 to an end of a fiber optic ribbon, buffer tubing is applied to the broken out individual optical fibers which normally extend about 1 meter in length subsequent to break-out device 100. At the remote end of each buffered optical fiber, an individual fiber optic connector is applied dependent upon the customer and the function that is to be performed. The overall fiber optic assembly described hereinabove has significant application in central offices of telephone companies as well as in other communications applications.

Figure 1:
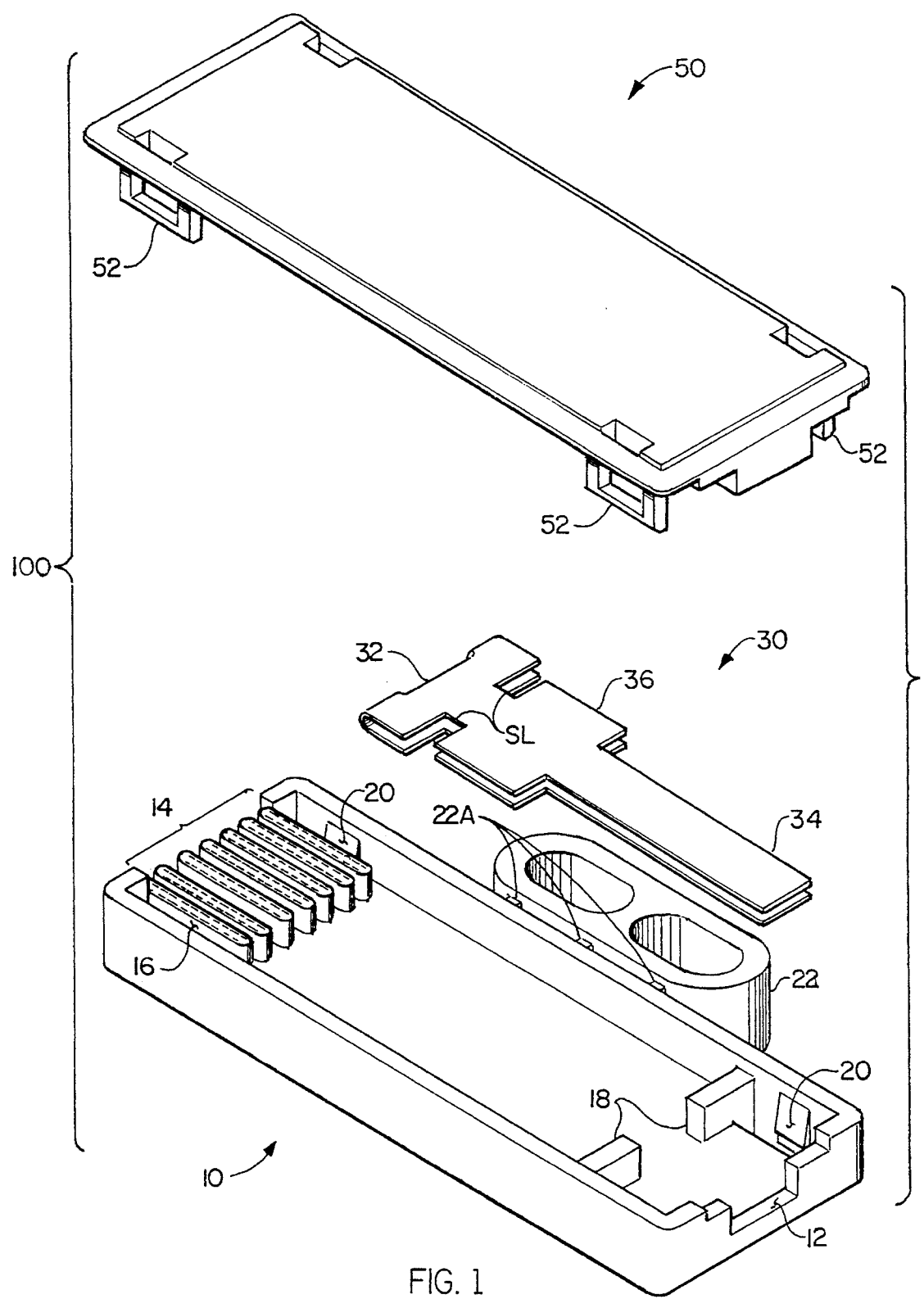
FIG. 1 is an exploded perspective view of a preferred embodiment of the break-out device of the present invention.
Figure 2A:
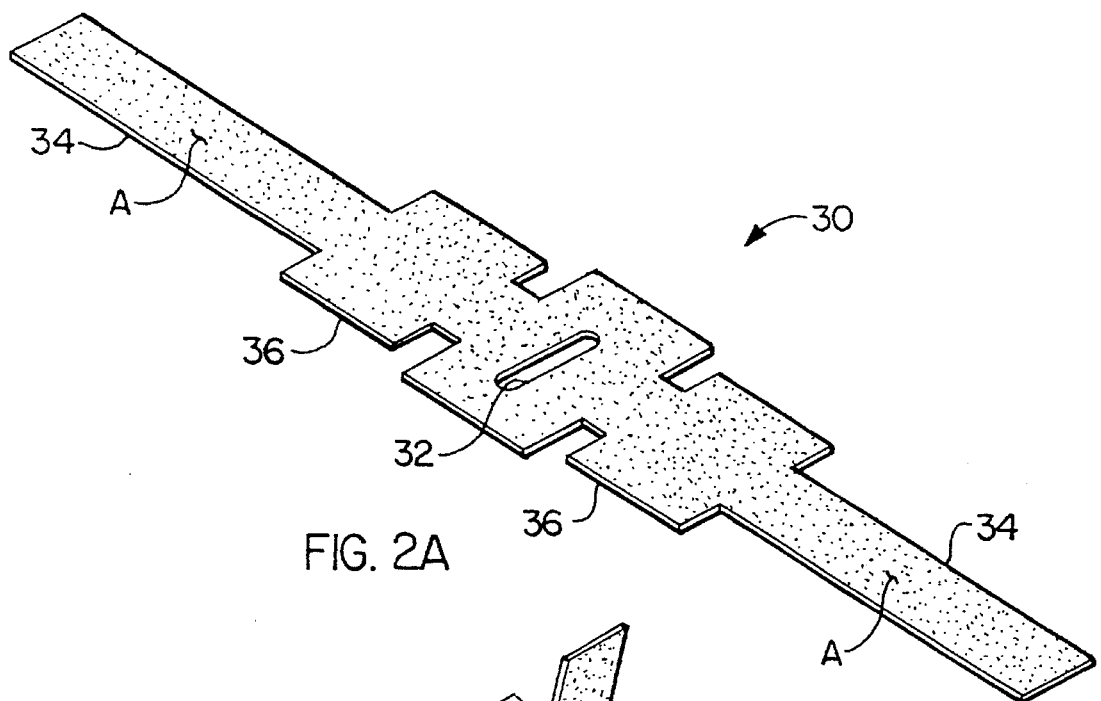
FIGS. 2A and 2B show the strain relief clamp of the break-out device of the present invention in extended and folded configurations, respectively.
Figure 2B:
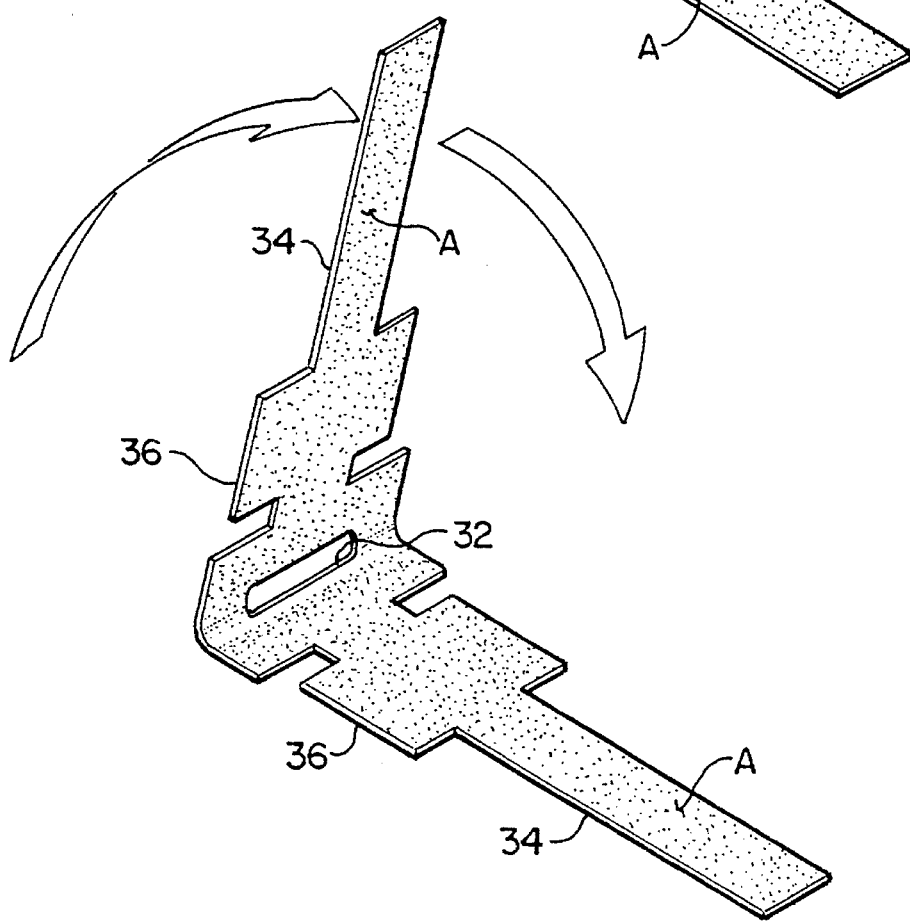
Figure 4:
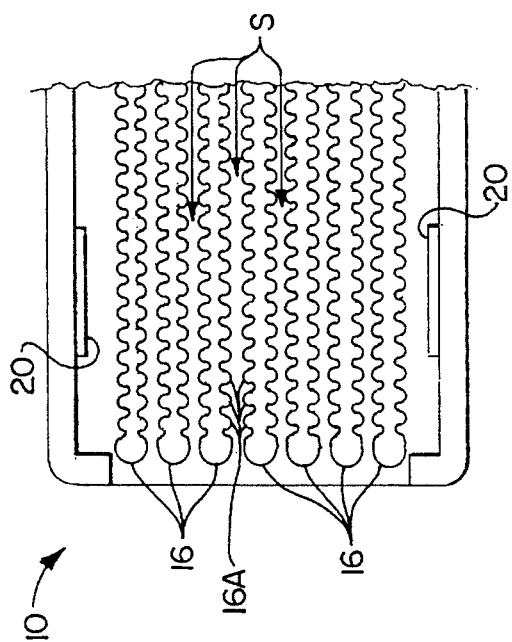
FIG. 4 is a fragmentary, vertical cross-sectional view of the rear end of the break-out device of the present invention.
Figure 3:
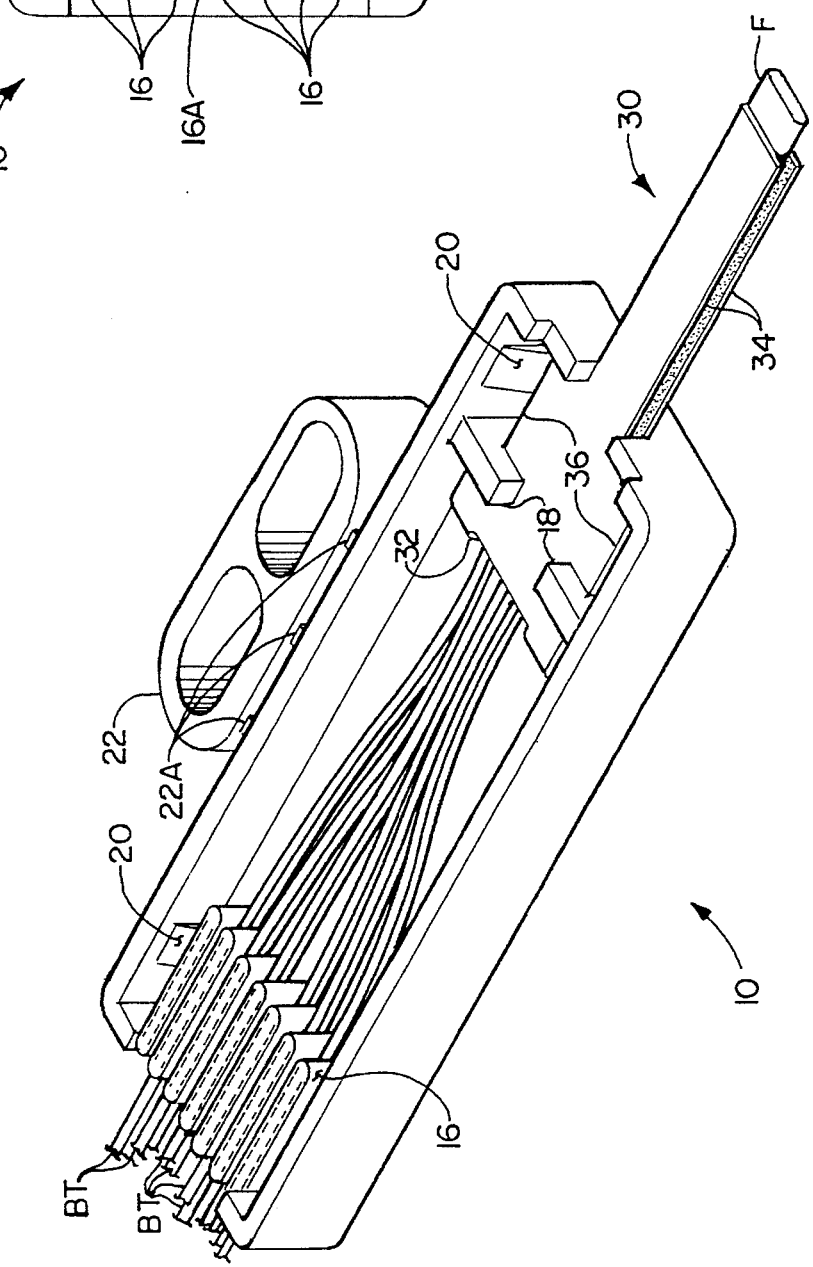
FIG. 3 is a perspective view of the break-out device of the present invention with the top removed for better clarity of illustration.

Break-out device 100 is formed from housing 10, flexible strain relief clamp 30 and housing top or lid 50 (see particularly FIG. 1). Housing 10 and lid 50 are most suitably formed from polybutyleneterephthlate (PBT) although other materials could be utilized. Break-out device housing 10 comprises an aperture 12 in the front end thereof for receiving a fiber optic ribbon F (see FIG. 3) and an aperture 14 at the rear end thereof to provide an exit for the broken-out optical fibers contained within buffer tubes BT for protection (see FIG. 3). Positioned within aperture 14 at the rear of break-out device housing 10 are seven (7) elongate and parallel protuberances 16 which provide six (6) slots or openings S for receiving buffer tubes BT therein. Assuming that fiber optic ribbon F is formed of twelve (12) optical fibers, two buffer tubes BT will be forced downwardly into each of the six (6) slots defined between seven (7) protuberances 16. As best seen with reference to FIG. 4, protuberances 16 are provided with small teeth 16A on the surface thereof which act to create resistance to pull-out forces (aft forces) on the buffer tubes BT during use of break-out device 100. Optionally, a suitable adhesive such as cyanoacrylate or epoxy adhesive may be applied to secure buffer tubes BT to teeth 16A of protuberances 16.

Also, break-out device housing 10 includes two lugs or shoulders 18 at the front end thereof adjacent aperture 12 which serve to interlock with corresponding slots SL in flexible strain relief clamp 30 so as to lock clamp 30 within housing 10 of break-out device 100. Housing 10 also contains four lugs 20 (two of four lugs 20 shown in FIG. 1) positioned adjacent each corner of housing 10 for snappingly engaging corresponding snap-lock elements 52 adjacent each respective corner of lid 50. Finally, mounting lug 22 is provided on the top of housing 10 to facilitate affixing break-out device 100 by screws, rivets or other methods to the side of cabinets, frames, racks, shelves or other locations for permanent adherence. At other times, a customer may choose to break off mounting lug 22 by applying force thereto so as to snap relatively fragile stems 22A securing break-off lug 22 to the main portion of housing 10.

With reference now to strain relief clamp 30, it can be seen that strain relief clamp 30 is formed of a highly flexible material (most suitably MYLAR), so as to be adapted to bend about the longitudinal axis of aperture 32 in the medial portion thereof. Strain relief clamp 30 is most suitably provided with a pressure sensitive adhesive coating A such as acrylic adhesives available from 3M Corporation on one side thereof so that a protective paper (not shown) may be peeled off to expose the adhesive coating for use. Strain relief clamp 30 further comprises an arm 34 on each side of aperture 32. Arms 34 each include an enlarged tab 36 along the length thereof which acts to enable strain relief clamp 30 to be interlockingly engaged with housing 10 in a manner which will be described in more detail hereinafter.

In use, the protective paper (not shown) is peeled off to expose adhesive coating A of strain relief clamp 30. Fiber optic ribbon F is passed through aperture 32, and strain relief clamp 30 is then folded back upon itself along the longitudinal axis of aperture 32 so as to engage fiber optic ribbon F between arms 34 thereof. Thus, fiber optic ribbon F is adhesively engaged between arms 34 of strain relief clamp 30 so as to provide strain relief (particularly from forwardly pulling or "fore" forces) to fiber optic ribbon F and to prevent any inadvertent splitting of the optical fibers beyond the desired break-out or stop point. The broken-out buffered optical fibers BF extend from the rear of strain relief clamp 30 and out of housing 10 through the six (6) slots S defined by protuberances 16 (see FIG. 4). As noted hereinbefore, the optical fibers broken-out from fiber optic ribbon F and extending outwardly from break-out device 10 are each covered and protected by buffer tubes. The buffered fibers BT are forced into six (6) slots S (preferably two (2) per slot for a twelve (12) optical fiber ribbon) positioned within aperture 14 of housing 10. The small teeth or serrations 16A provided on the surface area of seven (7) protuberances 16 serve to resist pull-out forces and provide strain relief (particularly in the aft direction) to the buffer tube-covered optical fibers BT fanning out at the break-out point from optical ribbon fiber F. In this fashion, break-out device 100 serves to provide both fore and aft strain relief to fiber optic ribbon F and the buffered optical fibers BT fanning out from the desired break-out point of fiber optic ribbon F.

Although other buffer tubing could be utilized, most suitably buffer tubing BT provided over the optical fibers broken out from fiber optic ribbon F and extending outwardly from the rear of strain relief clamp 30 is 900 micrometers in diameter and typically about 1 meter long to protect the length of optical ribbon fiber extending from the break-out point to the desired individual fiber optic connectors. The buffer tubing is also most suitably clear so that the different industry standard colors of optical fiber coatings (for example, twelve (12) in a fiber optic ribbon consisting of twelve (12) optical fibers) can be seen.

Finally, top or lid 50 of break-out device 100 is provided to be snapped down onto housing 10 by means of four (4) snap elements 52 which are urged into engagement with corresponding four (4) lugs 20 of housing 10. Thus, top or lid 50 may be easily snapped into engagement with housing 10 so as assist in snugly retaining strain relief clamp 30, fiber optic ribbon F and buffer tubes BT within break-out device 100.

It will thus be seen that there has been described above an improved break-out device which provides enhanced fore and aft strain relief to the fiber optic ribbon and broken-out optical fibers carried thereby, and which is inexpensive to manufacture and quick to assemble.

It will be understood that various details of the invention may be changed without departing from the scope of the invention. Furthermore, the foregoing description is for the purpose of illustration only, and not for the purpose of limitation—the invention being defined by the claims.

What is claimed is:

1. A break-out device for a fiber optic ribbon comprising:
   (a) a housing adapted to receive a fiber optic ribbon within one end thereof and to provide an exit for a plurality of buffered fibers at an opposing end thereof; and
   (b) a flexible elongate strain relief clamp adapted to be fixedly positioned within said housing and having an aperture in the medial portion thereof, said strain relief clamp being further adapted to receive a fiber optic ribbon within said aperture and to then be folded back upon itself at said aperture so as to fixedly engage the fiber optic ribbon between the overlaying portions thereof.

2. A break-out device according to claim 1 wherein said housing comprises a plurality of lugs therein at said one end which are adapted to interlockingly engage said folded strain relief clamp, and a plurality of slots therein at said opposing end which are adapted to receive one or more of said plurality of buffered fibers within each of said plurality of slots.

3. A break-out device according to claim 2 wherein said plurality of slots are formed by a plurality of elongate and parallel protuberances defining said plurality of slots therebetween, and wherein said protuberances comprise teeth on the slot-defining surfaces thereof for engaging said plurality of buffered fibers received by said slots.

4. A break-out device according to claim 1 wherein said housing is formed of plastic.

5. A break out device according to claim 1 wherein said strain relief clamp comprises an adhesive on both opposing sides of the overlaying portions of the folded strain relief clamp to engage the fiber optic ribbon.

6. A break out device according to claim 1 wherein said strain relief clamp is formed of plastic.

7. A break-out device for a fiber optic ribbon comprising:
  (a) a housing adapted to receive a fiber optic ribbon within one end thereof and to provide an exit for a plurality of buffered fibers at an opposing end thereof; and
  (b) a flexible elongate strain relief clamp adapted to be fixedly positioned within said housing and having an aperture in the medial portion thereof and an adhesive coating on at least one side thereof, said strain relief clamp being further adapted to receive a fiber optic ribbon within said aperture and to then be folded back upon itself at said aperture and on said adhesive coated side so as to fixedly engage the fiber optic ribbon between the overlaying adhesive coated portions thereof.

8. A break-out device according to claim 7 wherein said housing comprises a plurality of lugs therein at said one end which are adapted to interlockingly engage said folded strain relief clamp, and a plurality of slots therein at said opposing end which are adapted to receive one or more of said plurality of buffered fibers within each of said plurality of slots.

9. A break-out device according to claim 8 wherein said plurality of slots are formed by a plurality of elongate and parallel protuberances defining said plurality of slots therebetween, and wherein said protuberances comprise teeth on the slot-defining surfaces thereof for engaging said plurality of buffered fibers received by said slots.

10. A break-out device according to claim 7 wherein said housing is formed of plastic.

11. A break-out device according to claim 10 wherein said plastic is polybutyleneterephthlate (PBT).

12. A break-out device according to claim 7 wherein said strain relief clamp is formed of plastic.

13. A break-out device according to claim 12 wherein said plastic comprises MYLAR.

* * * * *